United States Patent
Yamashita et al.

(10) Patent No.: US 7,600,781 B2
(45) Date of Patent: Oct. 13, 2009

(54) INFLATOR

(75) Inventors: Haruhiko Yamashita, Tatsuno (JP);
Shinichiro Ukita, Tatsuno (JP); Atsushi Hatomoto, Tatsuno (JP); Akihisa Ogawa, Tatsuno (JP)

(73) Assignee: Daicel Chemical Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 11/947,566

(22) Filed: Nov. 29, 2007

(65) Prior Publication Data

US 2008/0136153 A1    Jun. 12, 2008

Related U.S. Application Data

(60) Provisional application No. 60/868,849, filed on Dec. 6, 2006.

(30) Foreign Application Priority Data

Dec. 1, 2006    (JP)    ............................. 2006-325311

(51) Int. Cl.
     *B60R 21/26*    (2006.01)
(52) U.S. Cl. ................................ 280/736
(58) Field of Classification Search ............ 280/736, 280/737, 740, 741, 742
See application file for complete search history.

(56) References Cited

U.S. PATENT DOCUMENTS 7,134,689 B2 * 11/2006 Matsuda et al. ............. 280/736

| 2003/0001370 | A1 | 1/2003 | Ryobo et al. |
| 2003/0151241 | A1 | 8/2003 | Matsuda et al. |
| 2005/0194772 | A1 | 9/2005 | Numoto et al. |
| 2006/0202455 | A1 | 9/2006 | Matsuda et al. |

FOREIGN PATENT DOCUMENTS

| EP | 1 405 775 A1 | 4/2004 |
| EP | 1 422 113 A1 | 5/2004 |
| JP | 2001-341610 A | 12/2001 |
| JP | 2003-226222 A | 8/2003 |

* cited by examiner

*Primary Examiner*—Faye M. Fleming
(74) *Attorney, Agent, or Firm*—Birch, Stewart, Kolasch & Birch, LLP

(57) ABSTRACT

An inflator includes: a pressurized gas filled with a pressurized gas and having a first end and a second end; a gas generator being connected to the first end, and including therein an ignition device and a molded article of a gas generating; a diffuser portion connected to the second end, and being provided with a gas discharge port; a communication path provided between the pressurized gas chamber and the gas generator and closed by a rupturable plate; a cap provided to cover the rupturable plate from the pressurized gas chamber side and having a plurality of gas holes formed at a circumference thereof, the minimum diameter (d min) of the gas hole being equal to or smaller than the larger one of the minimum diameter (D min) and the length (L) of the molded article of the gas generating composition.

6 Claims, 2 Drawing Sheets

INFLATOR

This nonprovisional application claims priority under 35 U.S.C. § 119(a) on Patent Application No. 2006-325311 filed in Japan on 1 Dec. 2006 and 35 U.S.C. § 119(e) on U.S. Provisional Application No. 60/868,849 filed on 6 Dec. 2006, which are incorporated by reference.

BACKGROUND OF INVENTION

1. Field of Invention

The present invention relates to an inflator for use in a restraint system of a vehicle.

2. Description of Related Art

A hybrid inflator, in which a solid gas generating agent is used in combination with pressurized gas, is sometimes employed in a side impact protection airbag, wherein the gas generating agent needs to be burned promptly. Therefore, there is known an inflator having a structure in which a large number of granular gas generating agents are disposed in a combustion chamber.

The granular gas generating agents that fill the inside of the combustion chamber are ignited by an ignition device to start combustion. The gas generating agents need to be burned completely within the combustion chamber, but when a large number of granular gas generating agents are used, half-burned or unburned gas generating agents flow out of the combustion chamber, whereby outputs of the inflator fluctuate and the performance of the inflator is destabilized.

JP-A No. 2003-226222 discloses a hybrid inflator having a bottle 22 containing pressurized gas and a gas generator housing 32 containing a gas generating agent. In the gas generator housing 32, a granular gas generating agent 36 is stored, and it is ignited and burnt by an ignition device 34. A cap 44 formed, on a side surface, with a discharge hole 42 is attached to the pressurized gas chamber bottle 22, and combustion residues or fragments of a rupturable plate 40 are collected by this cap 44.

JP-A No. 2001-341610 discloses a hybrid inflator. A first gas generating chamber 120 and an internal space 103 filled with a pressurized medium are communicated with each other via a first communication hole 125 formed on a gas generator housing 105. This communication hole 125 allows the passage of combustion gas generated from a gas generating agent 124 and is formed into a size so as to be able to prevent the gas generating agent 124 from leaking to the outside.

SUMMARY OF INVENTION

The present invention provides an inflator including an inflator comprising:

a pressurized gas chamber whose outer shell is formed by a cylindrical pressurized gas chamber housing, filled with a pressurized gas, a gas generator being connected to one end of the pressurized gas chamber, including an ignition device and a molded article of a gas generating composition in a gas generator housing, a diffuser portion being connected to the other end of the pressurized gas chamber, provided with a gas discharge port, a first communication path provided between the pressurized gas chamber and the gas generator and closed by a first rupturable plate, a second communication path provided between the pressurized gas chamber and the diffuser portion and closed by a second rupturable plate, a cap having a plurality of gas holes through which gas passes, the cap being disposed to cover the first rupturable plate from a side of the pressurized gas chamber, the minimum diameter (d min) of the gas hole being equal to or smaller than the larger one of the minimum diameter (D min) and the length (L) of the molded gas generating composition.

The present invention also provides an inflator including:

a pressurized gas filled with a pressurized gas and having a first end and a second end;

a gas generator being connected to the first end, and including therein an ignition device and a molded article of a gas generating;

a diffuser portion connected to the second end, and being provided with a gas discharge port;

a communication path provided between the pressurized gas chamber and the gas generator and closed by a rupturable plate;

a cap provided to cover the rupturable plate from the pressurized gas chamber side and having a plurality of gas holes formed at a circumference thereof, the minimum diameter (d min) of the gas hole being equal to or smaller than the larger one of the minimum diameter (D min) and the length (L) of the molded article of the gas generating composition.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
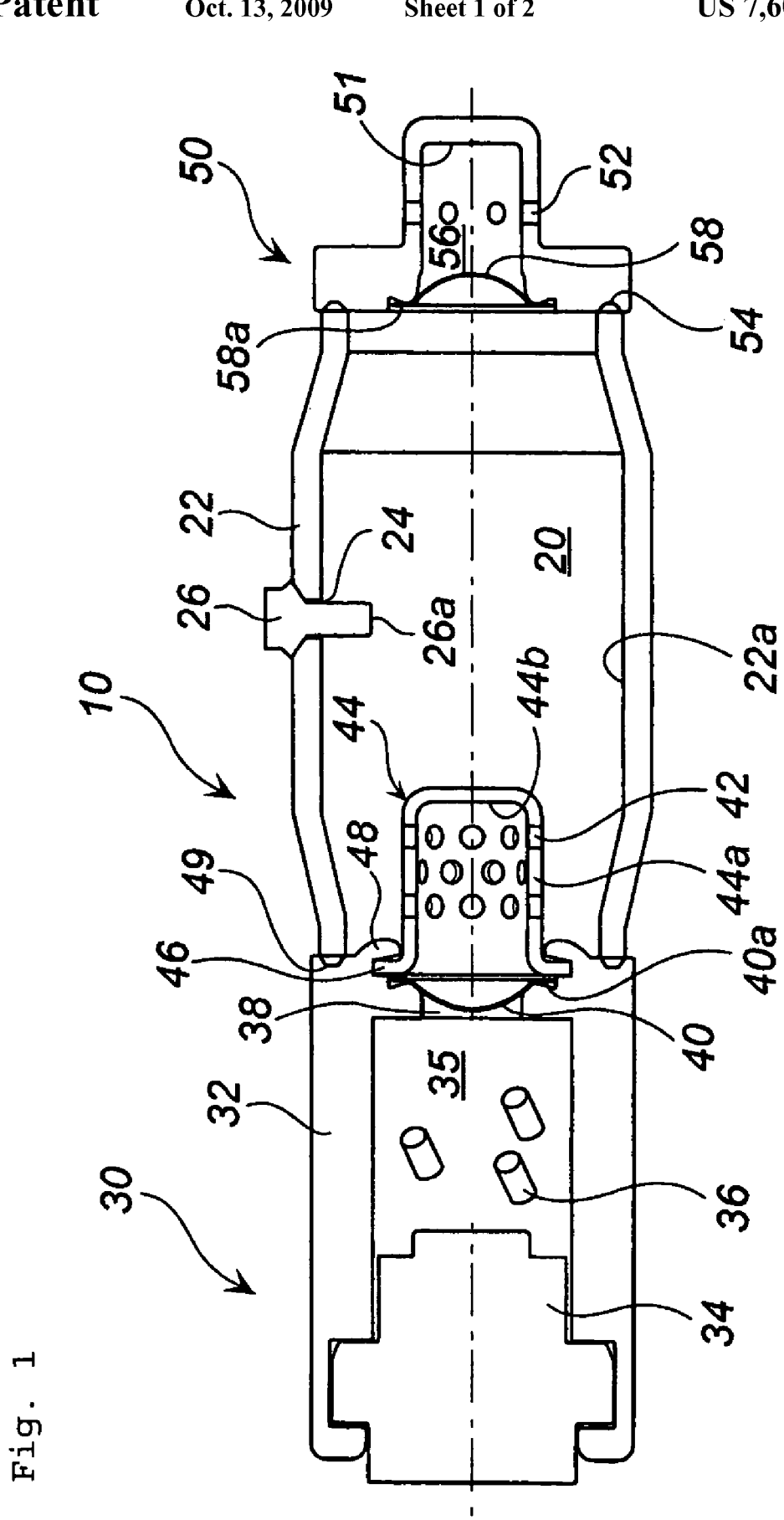
FIG. 1 shows a cross sectional view of the inflator of the present invention.

JP-A No. 2003-226222 discloses an inflator capable of preventing the combustion residues or fragments of the rupturable plate from leaking, but does not disclose prevention of leakage of unburned gas generating agents and specific means therefor. The invention disclosed in JP-A No. 2001-341610 is an inflator in which a weight thereof is reduced, the manufacturing processes is simplified and the gas flow is controlled, but it does not relate to leakage of the unburned gas generating agents and destabilization of the performance of the gas generator that is caused by the leakage.

Specifically, neither of the JP-A No. 2003-226222 and JP-A No. 2001-341610 discloses leakage of the unburned gas generating agents and problems caused by the leakage. The subject solved by the art is completely different from that solved by the present invention.

The present invention provides an inflator using a large number of granular molded articles of a gas generating composition and pressurized gas, wherein generation of molded articles of a gas generating composition, which are in the middle of being burned or in an unburned state is prevented so as to obtain stable outputs.

When the inflator of the present invention is applied to an airbag apparatus, the molded article of the gas generating composition in a combustion chamber is burned by an activation of the ignition device, the pressure in the combustion chamber, which has been the same as the ambient pressure, is increased by the combustion gas, whereby the first rupturable plate ruptures and the first communication path is opened. Thereby, high-temperature gas flows into the pressurized gas chamber via the cap. Then, the second rupturable plate ruptures when the pressure in the pressurized gas chamber increases, whereby the second communication path is opened, thus the pressurized gas and the high-temperature gas are discharged from the gas discharge hole via the diffuser portion to inflate the airbag.

It is preferable that the molded article of the gas generating composition be burned completely within the combustion chamber and that only the gas flows into the pressurized gas chamber. However, since the first communication path is formed largely in order to secure flow rate and to rupture the first rupturable plate reliably, some molded articles of a gas generating composition that are half-burned before being burned completely, are carried by a gas flow produced by opening the first communication path and discharged from the combustion chamber.

In view of this, the inflator of the present invention is provided with the cap, and the size of the gas hole of the cap is associated with the size of the molded article of the gas generating composition, thus, even when a half-burned molded article of the gas generating composition is discharged from the combustion chamber, the half-burned molded article of the gas generating composition is burned completely inside the cap, and thereafter only gas is discharged into the pressurized gas chamber. Therefore, outputs of the inflator are stabilized.

The gas holes of the cap are preferably formed into a circular shape, but may be formed into an oval shape or the like. When forming into a circular shape, the minimum diameter (d min) indicates a diameter thereof, and when forming into an oval shape, the minimum diameter (d min) indicates a minor axis.

A known molded article of a gas generating composition can be used in the present invention, and a molded article in a shape of a disk, a column, a column having a through-hole, or a column having a non-through-hole (hollow) can be used. In the case of a disk-shaped molded article, the minimum diameter (D min) indicates a diameter thereof, and in the case of a column, the minimum diameter (D min) indicates a diameter of an end surface thereof.

It should be noted that when the molded article of the gas generating composition is in the form of a columnar shape, the same effects can be expected if L>d min is satisfied even when D min<d min is obtained. Therefore, the minimum diameter (d min) of the gas hole may be equal to or smaller than the larger one of the minimum diameter (D min) and the length (L) of the molded article of the gas generating composition. If a solid gas generating agent is in a spherical shape, D min=L≧d min is obtained.

The present invention further provides the inflator, wherein a side of an opening portion of the cap is placed so as to cover the first rupturable plate, a bottom surface of the cap is placed opposite to the first rupturable plate, and the plurality of gas holes are formed only on a peripheral surface of the cap, and the relationship between a distance (W) formed between the bottom surface of the cap and an end portion of the closest or proximate gas hole to the bottom surface of the cap and the minimum diameter (D min) of the molded article of the gas generating composition satisfies a relationship of D min/2<W.

In the operation process described above, when the first communication path is opened and the half-burned molded article of the gas generating composition is discharged from the combustion chamber, the half-burned molded article of the gas generating composition collides with the bottom surface of the cap, that is opposite to the first rupturable plate (i.e., the first communication path). Therefore, if the relationship of D min/2<W is satisfied, the half-burned molded article of the gas generating composition is completely burned in the vicinity of the bottom surface of the cap, and thereafter only the gas flows into the pressurized gas chamber via the gas holes.

When the above-mentioned relationship is obtained, the half-burned molded article of the gas generating composition is easily held (easily caught) in the vicinity of the bottom surface of the cap. It is preferred in terms of combustion of the gas generating agent that the half-burned molded article of the gas generating composition remains in the vicinity of the combustion chamber as much as possible, even if exists on the outside of the combustion chamber. Accordingly, the half-burned molded article of the gas generating composition is burned completely so that it does not leak to the outside of the cap.

The present invention further provides the inflator, wherein a side of an opening portion of the cap is placed so as to cover the first rupturable plate, a bottom surface of the cap is placed opposite to the first rupturable plate, and the plurality of gas holes are formed only on a peripheral surface of the cap, and the relationship between a distance (W) formed between the bottom surface of the cap and a end portion of the closest or proximate gas hole to the bottom surface of the cap and the length (L) of the molded article of the gas generating composition satisfies a relationship of L/2<W.

When the above-mentioned relationship is obtained, the half-burned molded article of the gas generating composition is easily held (easily caught) in the vicinity of the bottom surface of the cap. It is preferred in terms of combustion of the gas generating agent that the half-burned molded article of the gas generating composition remains in the vicinity of the combustion chamber as much as possible, even if it exists on the outside of the combustion chamber. Accordingly, the half-burned molded article of the gas generating composition is burned completely so that it does not leak to the outside of the cap.

According to the inflator of the present invention, even when all of the molded articles of the gas generating composition are not completely burned in the combustion chamber and some of the molded articles of the gas generating composition flow out of the combustion chamber, they are captured by the cap and burned inside the cap, whereby gas is generated. Therefore, the molded articles of the gas generating composition inside the inflator are burned completely, thus designed outputs are obtained stably.

Embodiment of the Invention

One embodiment is described using FIG. 1. FIG. 1 is an axial sectional view of the inflator of the present invention, FIG. 2(a) is a partial enlarged view of FIG. 1, and FIG. 2(b) is a perspective view of a molded article of a gas generating composition shown in FIG. 1.

An inflator 10 has a pressurized gas chamber 20, a gas generator 30, and a diffuser portion 50.

An outer shell of the pressurized gas chamber 20 is formed by a cylindrical pressurized gas chamber housing 22, and pressurized gas including a mixture of argon and helium is charged therein. The pressurized gas chamber housing 22 has a symmetrical shape with respect to the axial direction and the radial direction, thus it is not necessary to adjust the orientation of the pressurized gas chamber housing 22 in the axial direction and radial direction when assembling.

A filling hole 24 for filling pressurized gas is formed on a side surface of the pressurized gas chamber housing 22, and this hole is sealed by a pin 26 after the pressurized gas is filled. An end portion 26a of the pin 26 protrudes into the pressurized gas chamber 20, and the protruding portion has a length such that a combustion gas flow of a molded article of a gas generating composition 36 collides therewith. By adjusting the length of the protruding portion of the pin 26, the combustion gas can be caused to collide with the pin 26 itself to adhere combustion residues thereto. In FIG. 1, the protruding portion can be extended to abut against a wall surface 22a which is opposite to the end portion 26a of the pin 26.

The gas generator 30 has an ignition device (electric igniter) 34 and the molded article of the gas generating composition 36 that are accommodated in a gas generator housing 32, and is connected to one end of the pressurized gas chamber 20. A space that is filled with the molded articles of the gas generating composition 36 is a combustion chamber 35. The gas generator housing 32 and the pressurized gas chamber housing 22 are joined to each other by resistance-welding at a joint portion 49. When incorporating the inflator 10 into an airbag system, the ignition device 34 is connected to an external power source via a connector and a conducting wire.

A known molded article of a gas generating composition can be used as the molded article of the gas generating composition 36. Since the illustrated molded articles of the gas generating composition 36 are formed in a columnar shape, the minimum diameter (D min) thereof indicates the diameter of an end surface.

A first communication path 38 between the pressurized gas chamber 20 and the gas generator 30 is sealed by a first rupturable plate 40 that is deformed into a bowl-like shape by the pressure of the pressurized gas, and thus the interior of the gas generator 30 is held at an ambient pressure. The first rupturable plate 40 is joined to the gas generator housing 32 by resistance-welding at a peripheral edge portion 40a.

A cap 44 is placed to cover the first rupturable plate 40 from the pressurized gas chamber 20 side. This cap 44 is attached to cover the first rupturable plate 40 (i.e., the first communication path 38) so that the combustion gas generated by burning the molded articles of the gas generating composition 36 is discharged from a gas hole 42 via the cap 44.

The cross section of the cap 44 is a circular shape, a plurality of the gas holes 42 are formed only on a peripheral surface 44a of the cap 44, and a bottom surface 44b of the cap is placed opposite to the first rupturable plate 40 (i.e., the first communication path 38).

Each of the gas holes 42 formed on the peripheral surface 44a is in a circular shape, and the diameter, d min, is equal to or smaller than the minimum diameter (D min) of the molded article of the gas generating composition 36 and is preferably smaller than the minimum diameter (D min) of the molded article of the gas generating composition 36.

The relationship between a distance (W) between the bottom surface 44b of the cap and an end portion of the closest or proximate gas hole 42a to the bottom surface 44b of the cap (see FIG. 2(b)) and the minimum diameter (D min) of the molded article of the gas generating composition 36 is preferably D min/2<W, and more preferably D min<W.

The cap 44 has a flange portion 46 whose peripheral edge portion of the opening is bent outward, and is fixed by crimping a part (a crimping portion) 48 of the gas generator housing 32 at the flange portion 46.

The diffuser portion 50, that has a gas discharge hole 52 for discharging the pressurized gas and the combustion gas, is connected to the other end of the pressurized gas chamber 20, and the diffuser portion 50 and the pressurized gas chamber housing 22 are joined to each other by resistance-welding at a joint portion 54.

The diffuser portion 50 has a plurality of gas discharge holes 52 for allowing the gas to pass therethrough, and is in the form a cap. A second communication path 56 formed between the pressurized gas chamber 20 and the diffuser portion 50 is sealed by a second rupturable plate 58, and thus the interior of the diffuser portion 50 is held at an ambient pressure. The second rupturable plate 58 is joined to the diffuser portion 50 by resistance-welding at a peripheral edge portion 58a.

Figure 2:
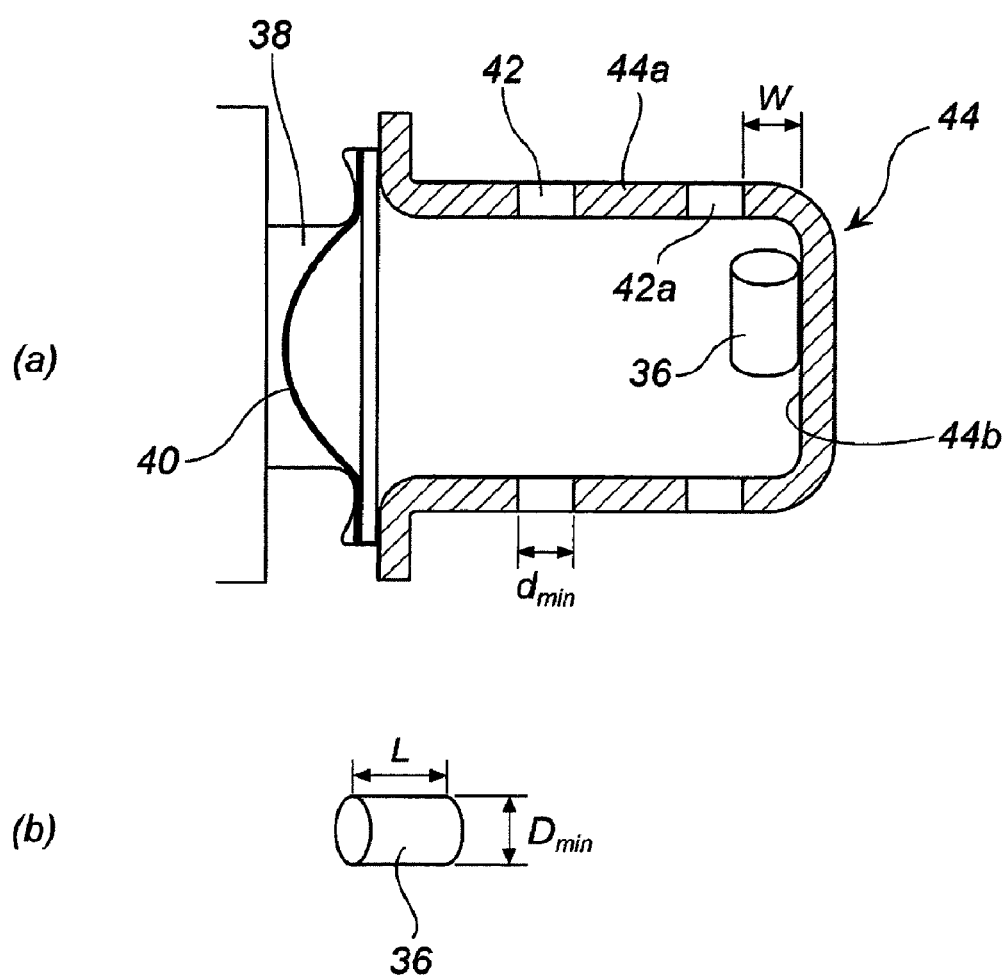
FIG. 2(a) shows a partial enlarged view of FIG. 1.
FIG. 2(b) is a perspective view of the gas generating agent shown in FIG. 1.

Next is described an operation of the inflator 10, shown in FIG. 1 and FIG. 2, incorporated into an airbag system installed in a vehicle.

When the vehicle collides and receives the impact, the ignition device 34 is activated and ignited by an activation signal output device to burn the molded articles of the gas generating composition 36 inside the combustion chamber 35 and generate high-temperature combustion gas.

Thereafter, the first rupturable plate 40 ruptures when the pressure inside the gas generator 30 is increased by the high-temperature combustion gas, whereby the first communication path 38 is opened, thus the combustion gas flows into the cap 44, is then discharged from the gas holes 42, and flows into the pressurized gas chamber 20.

Thereafter, the second rupturable plate 58 ruptures when the pressure inside the pressurized gas chamber 20 increases, thus the pressurized gas and the combustion gas are discharged from the gas discharge holes 52 via the second communication path 56 to inflate the airbag.

In the operation described above, when half-burned or unburned molded articles of a gas generating composition 36 are present inside the combustion chamber 35, they are carried by a gas flow and discharged into the cap 44 via the opened first communication path 38. Then, the half-burned or unburned molded articles of the gas generating composition 36 collide with the bottom surface 44b of the cap and captured there. In this state, since the gas generating composition 36 that is not completely burned exists in the vicinity of the combustion chamber 35, it can be easily burned completely by the combustion gas (high-temperature gas) generated from the combustion chamber 35. If the gas generating composition 36 that is not completely burned passes through the gas holes 42 of the cap 44 and flows toward the vicinity of the second communication path 56, the influence of the high-temperature combustion gas is small, thus combustion is discontinued.

As described above, the half-burned or unburned molded articles of the gas generating composition 36 are prevented from being discharged from the gas holes 42 of the cap 44 and are burned completely before the gas generating composition 36 reach the pressurized gas chamber 20. Therefore, the designed outputs are realized stably.

The invention thus described, it will be obvious that the same may be varied in many ways. Such Variations are not to be regarded as a departure from the spirit and scope of the invention, and all such modifications as would be obvious to one skilled in the art are intended to be included within the scope of the following claims.

The invention claimed is:

1. An inflator, comprising:
    a pressurized gas chamber whose outer shell is formed by a cylindrical pressurized gas chamber housing, filled with a pressurized gas;
    a gas generator being connected to one end of the pressurized gas chamber, including an ignition device and a molded article of a gas generating composition, having a circular cross section, in a gas generator housing;

a diffuser portion being connected to the other end of the pressurized gas chamber, provided with a gas discharge port;

a first communication path provided between the pressurized gas chamber and the gas generator and closed by a first rupturable plate; and a second communication path provided between the pressurized gas chamber and the diffuser portion and closed by a second rupturable plate; and a cap covering the first rupturable plate from a side of the pressurized gas chamber, the cap having a peripheral surface provided with a plurality of gas holes through which gas passes, and a bottom surface that opposes the first rupturable plate; and, the cap being disposed to cover the first rupturable plate from the pressurized gas chamber side, the minimum diameter (d min) of each of the plurality of gas holes being equal to or smaller than the larger one of the minimum diameter (D min) and the length (L) of the molded article of the gas generating composition, such that half-burned and unburned gas generating compositions are completely burned inside the cap, stabilizing an output of the inflator.

2. The inflator according to claim 1, wherein the plurality of gas holes are formed only on the peripheral surface of the cap, and the relationship between a distance (W) formed between the bottom surface of the cap and an end portion of the closest or proximate gas hole to the bottom surface of the cap and the minimum diameter (D min) of the molded article of the gas generating composition satisfies a relationship of D min/2<W.

3. The inflator according to claim 1, wherein the plurality of gas holes are formed only on the peripheral surface of the cap, and the relationship between a distance (W) formed between the bottom surface of the cap and a end portion of the closest or proximate gas hole to the bottom surface of the cap and the length (L) of the molded article of the gas generating composition satisfies a relationship of L/2<W.

4. An inflator, comprising:

a pressurized gas chamber filled with a pressurized gas and having a first end and a second end;

a gas generator being connected to the first end, and including therein an ignition device and a molded article of a gas generating composition;

a diffuser portion connected to the second end, and being provided with a gas discharge port;

a communication path provided between the pressurized gas chamber and the gas generator and closed by a rupturable plate; and a cap covering the rupturable plate from a side of the pressurized gas chamber and having a peripheral surface provided with a plurality of gas holes and a bottom surface that opposes the rupturable plate, the minimum diameter (d min) of each of the plurality of gas holes being equal to or smaller than the larger one of the minimum diameter (D min) and the length (L) of the molded article of the gas generating composition, such that a half-burned and unburned gas generating compositions are completely burned inside the cap, stabilizing an output of the inflator.

5. The inflator according to claim 1, wherein the bottom surface and the peripheral surface in a vicinity of the bottom surface form a capturing portion for capturing the half-burned and unburned gas generating composition.

6. The inflator according to claim 1, wherein the bottom surface and the peripheral surface in a vicinity of the bottom surface form a capturing portion for capturing the half-burned and unburned gas generating composition.

* * * * *